US008619444B2

(12) United States Patent
Kawasoe

(10) Patent No.: US 8,619,444 B2

(45) Date of Patent: Dec. 31, 2013

(54) VOLTAGE BOOSTER SYSTEM AND SEMICONDUCTOR CHIP

(75) Inventor: Suguru Kawasoe, Miyazaki (JP)

(73) Assignee: Lapis Semiconductor Co., Ltd., Tokyo (JP)

( * ) Notice: Subject to any disclaimer, the term of this patent is extended or adjusted under 35 U.S.C. 154(b) by 76 days.

(21) Appl. No.: 13/450,862

(22) Filed: Apr. 19, 2012

(65) Prior Publication Data

US 2012/0268096 A1 Oct. 25, 2012

(30) Foreign Application Priority Data

Apr. 20, 2011 (JP) ................................ 2011-093828

(51) Int. Cl.
*H02M 3/18* (2006.01)
*H02M 7/00* (2006.01)

(52) U.S. Cl.
USPC ............... 363/59; 363/60; 307/109; 307/110; 327/536; 327/537; 327/538

(58) Field of Classification Search
USPC ............... 363/59, 60; 307/109, 110; 327/536, 327/537, 538
See application file for complete search history.

(56) References Cited

U.S. PATENT DOCUMENTS

| | | | | |
|---|---|---|---|---|
| 6,411,531 | B1 * | 6/2002 | Nork et al. | 363/60 |
| 7,015,841 | B2 * | 3/2006 | Yoshida et al. | 341/120 |
| 7,397,677 | B1 * | 7/2008 | Collins et al. | 363/60 |
| 7,746,676 | B2 * | 6/2010 | Feng et al. | 363/60 |
| 8,193,853 | B2 * | 6/2012 | Hsieh et al. | 327/536 |
| 8,248,150 | B2 * | 8/2012 | Tadeparthy et al. | 327/534 |
| 8,427,127 | B2 * | 4/2013 | Dowlatabadi | 323/284 |
| 8,471,537 | B2 * | 6/2013 | Joo | 323/267 |
| 2011/0156670 | A1 * | 6/2011 | Tadeparthy et al. | 323/273 |

FOREIGN PATENT DOCUMENTS

JP 2005-044203 A 2/2005

* cited by examiner

*Primary Examiner* — Bao Q Vu

(74) *Attorney, Agent, or Firm* — Kubotera & Associates, LLC

(57) ABSTRACT

A voltage booster system of a charge pump type includes a regulator for outputting a constant voltage and a charge pump circuit for boosting a voltage of an output terminal of the regulator. The regulator includes a differential amplifier unit for inputting a reference voltage and a feedback voltage according to the voltage of the output terminal, and an output stage portion including an PN connection element having one end portion connected to an application terminal of a power source voltage and another end portion connected to the output terminal. The PN connection element is configured to be controlled according to an output signal of the differential amplifier unit. The charge pump circuit includes a first capacitor to which the voltage of the output terminal is applied to be charged; a second capacitor; a third capacitor; a first switching section; and a second switching section.

14 Claims, 8 Drawing Sheets

VOLTAGE BOOSTER SYSTEM AND SEMICONDUCTOR CHIP

BACKGROUND OF THE INVENTION AND RELATED ART STATEMENT

The present invention relates to a voltage booster system and a semiconductor chip. In particular, the present invention relates to a voltage booster system of a charge pump type and a semiconductor chip.

In a conventional liquid crystal display system, it is necessary to generate a voltage higher than a power source voltage for driving a liquid crystal panel. Accordingly, in a semiconductor integrated circuit constituting a drive circuit of the liquid crystal panel, a conventional voltage booster system of a charge pump type is provided for stepping up the power source voltage.

FIG. 1 is a circuit diagram showing the conventional voltage booster system of the charge pump type. As shown in FIG. 1, the conventional voltage booster system includes a regulator 11' and a charge pump circuit 12'. The regulator 11' includes an operation amplifier 15' for generating and outputting a constant voltage, a power source 14', and resistors R1' and R2'.

In the conventional voltage booster system, the operation amplifier 15' is configured to operate at a power source voltage VDD'. Further, a reference voltage Vref' of the power source 14' is applied to a non-inversion input terminal of the operation amplifier 15'. The resistors R1' and R2' are connected in series between an output terminal of the operation amplifier 15' and a reference potential (a ground potential) terminal. The resistors R1' and R2' constitute a divider circuit, so that a divided voltage is generated at a connection point between the resistors R1' and R2'. The divided voltage is applied to an inversion input terminal of the operation amplifier 15'.

As shown in FIG. 1, the charge pump circuit 12' includes switching elements SW1' to SW4' and capacitors C1' to C3' connected externally. Further, the charge pump circuit 12' includes connection terminals A1' to A4'. The connection terminal A1' is connected to the output terminal of the operation amplifier 15'.

In the conventional voltage booster system, the switching element SW1' is connected between the connection terminal A1' and the connection terminal A3'. The switching element SW2' is connected between the connection terminal A1' and the connection terminal A4'. The switching element SW3' is connected between the connection terminal A2' and the connection terminal A3'. The switching element SW4' is connected between the connection terminal A4' and the reference potential terminal. The capacitor C1' is connected between the connection terminal A1' and the reference potential terminal. The capacitor C2' is connected between the connection terminal A2' and the reference potential terminal. The capacitor C3' is connected between the connection terminal A3' and the connection terminal A4'.

In the conventional voltage booster system, the resistor R1' and R2' divide an output voltage VL1' of the operation amplifier 15' in the regulator 11', and the divided voltage is supplied to the inversion input terminal of the operation amplifier 15'. The operation amplifier 15' is configured to operate such that the divided voltage becomes substantially equal to the reference voltage Vref' applied to the non-inversion input terminal of the operation amplifier 15', thereby stabilizing the output voltage VL1'. The output voltage VL1' is applied to the capacitor C1' of the charge pump circuit 12', so that electric charges are accumulated in the capacitor C1'. Accordingly, it is possible to stabilize the output voltage VL1'.

FIG. 2 is a time chart showing an on-off operation of the charge pump circuit 12' of the conventional voltage booster system. As shown in FIG. 2, the switching elements SW1' to SW4' of the charge pump circuit 12 alternately become an on state and an off state.

More specifically, during a period of a first step, the switching elements SW1' and SW4' become the on state and the switching elements SW2' and SW3' become the off state. On the other hand, during a period of a second step, the switching elements SW1' and SW4' become the off state and the switching elements SW2' and SW3' become the on state. During the first step and the second step, the output voltage VL1' of the operation amplifier 15' is applied to the capacitor C1'.

In the conventional voltage booster system, when the switching elements SW1' and SW4' become the on state in the first step, the output voltage VL1' of the operation amplifier 15' is applied to the capacitor C3', so that a pump current flows and electric charges are accumulated in the capacitor C3'. Accordingly, a voltage between both end portions of the capacitor C3' becomes equal to the output voltage VL1'.

Further, in the conventional voltage booster system, when the switching elements SW1' and SW4' become the off state and the switching elements SW2' and SW3' become the on state in the second step, a combined voltage of the capacitor C3' and the capacitor C1' is applied to the capacitor C2', so that electric charges of the capacitor C3' flow into the capacitor C2'. When the first step and the second step are alternately repeated, a voltage VL2' of the capacitor C2', that is, the connection terminal A2', becomes double of the output voltage VL1'.

Patent Reference has disclosed another conventional voltage booster system. In the conventional voltage booster system disclosed in Patent reference, a regulator is disposed on a later stage of the charge pump circuit. Further, switching elements having different levels of on resistivity are arranged in the regulator. When the regulator rises up, the switching element having a higher level of the on resistivity is sequentially turned on. Accordingly, it is possible to prevent a voltage step up through the charge pump circuit from decreasing due to a smooth capacitor.

Patent Reference: Japanese Patent Publication No. 2005-044203

In the conventional voltage booster system, the output terminal of the operation amplifier 15' is connected to the capacitor C1' through the connection terminal A1'. Accordingly, immediately after the power source voltage VDD' is supplied to the operation amplifier 15', an inrush current flows from the operation amplifier 15' to the capacitor C1', so that the capacitor C1' is charged. Further, immediately after starting the first step, during which the switching elements SW1' and SW4' become the on state, an inrush current flows from the operation amplifier 15' to the capacitor C3' through the switching element SW1', so that the capacitor C3' is charged.

In the conventional voltage booster system, if the power source has a small capacity such as a battery and the like, when the inrush current flows, the power source voltage VDD' tends to decrease due to the inrush current. When the power source voltage VDD' decreases, other circuit in the device such as a drive circuit may cause a malfunction.

To this end, similar to the conventional voltage booster system disclosed in Patent reference, transistors having the different levels of the on resistivity may be arranged in the regulator. When the regulator is started, the transistor having a higher level of the on resistivity is sequentially turned on.

Accordingly, it is possible to prevent the power source voltage from decreasing due to the charge pump circuit.

However, in this case, it is necessary to supply a current into the charge pump circuit 12' in the first step to charge the capacitor C3' shown in FIG. 1. Accordingly, in order to prevent the voltage from decreasing in the operation during the first step, it is necessary to control two transistors of the regulator 11' every time the capacitor C3' is charged. As a result, the drive performance of the regulator 11' tends to lower each time. When there is other circuit utilizing the output voltage of the regulator, the circuit tends to operate unstably.

In view of the problems described above, an object of the present invention is to provide a voltage booster system and a semiconductor chip capable of solving the problems of the conventional voltage booster system. In the present invention, it is possible to stably operate a charge pump circuit even when an output voltage of a regulator is supplied to a circuit other than the charge pump circuit without destabilizing the circuit.

Further objects and advantages of the invention will be apparent from the following description of the invention.

SUMMARY OF THE INVENTION

In order to attain the objects described above, according to a first aspect of the present invention, a voltage booster system of a charge pump type includes a regulator for outputting a constant voltage and a charge pump circuit for boosting a voltage of an output terminal of the regulator.

According to the first aspect of the present invention, the regulator includes a differential amplifier unit for inputting a reference voltage and a feedback voltage according to the voltage of the output terminal, and an output stage portion including an PN connection element having one end portion connected to an application terminal of a power source voltage and another end portion connected to the output terminal. The PN connection element is configured to be controlled according to an output signal of the differential amplifier unit.

According to the first aspect of the present invention, the charge pump circuit includes a first capacitor to which the voltage of the output terminal is applied to be charged; a second capacitor; a third capacitor; a first switching section; and a second switching section.

According to the first aspect of the present invention, a first step and a second step are sequentially performed as a voltage boosting operation. In the first step, the first switching section becomes an on state and the second switching section becomes an off state, so that the voltage of the output terminal is applied to the second capacitor through the first switching section to accumulate electric charges in the second capacitor. In the second step, the first switching section becomes the off state and the second switching section becomes the on state, so that a combined voltage of a first voltage between both end portions of the first capacitor and a second voltage between both end portions of the second capacitor is applied to the third capacitor through the second switching section to accumulate electric charges in the second capacitor.

According to the first aspect of the present invention, the PN connection element is configured to increase an internal resistivity thereof after the regulator starts up until a first specific period of time is elapsed relative to that after the first specific period of time is elapsed, so that an electric current flowing from the application terminal of the power source voltage to the first capacitor is restricted.

According to the first aspect of the present invention, the first switching section is configured to increase an on resistivity thereof after the voltage boosting operation is started until a second specific period of time is elapsed relative to that after the second specific period of time is elapsed, so that an electric current flowing from the output terminal to the second capacitor is restricted.

Further, according to a second aspect of the present invention, a semiconductor chip includes a regulator for outputting a constant voltage and a charge pump circuit for boosting a voltage of an output terminal of the regulator.

According to the second aspect of the present invention, the regulator includes a differential amplifier unit for inputting a reference voltage and a feedback voltage according to the voltage of the output terminal, and an output stage portion including an PN connection element having one end portion connected to an application terminal of a power source voltage and another end portion connected to the output terminal. The PN connection element is configured to be controlled according to an output signal of the differential amplifier unit.

According to the second aspect of the present invention, the charge pump circuit includes a first terminal to be externally connected to one end portion of a first capacitor to which the voltage of the output terminal is applied to be charged; a second terminal and a third terminal to be externally connected to both end portions of a second capacitor; a fourth terminal to be externally connected to a third capacitor; a first switching section; and a second switching section.

According to the second aspect of the present invention, a first step and a second step are sequentially performed as a voltage boosting operation. In the first step, the first switching section becomes an on state and the second switching section becomes an off state, so that the voltage of the output terminal is applied to the second capacitor through the first switching section to accumulate electric charges in the second capacitor. In the second step, the first switching section becomes the off state and the second switching section becomes the on state, so that a combined voltage of a first voltage between both end portions of the first capacitor and a second voltage between both end portions of the second capacitor is applied to the third capacitor through the second switching section to accumulate electric charges in the second capacitor.

According to the second aspect of the present invention, the PN connection element is configured to increase an internal resistivity thereof after the regulator starts up until a first specific period of time is elapsed relative to that after the first specific period of time is elapsed, so that an electric current flowing from the application terminal of the power source voltage to the first capacitor is restricted.

According to the second aspect of the present invention, the first switching section is configured to increase an on resistivity thereof after the voltage boosting operation is started until a second specific period of time is elapsed relative to that after the second specific period of time is elapsed, so that an electric current flowing from the output terminal to the second capacitor is restricted.

According to the first aspect and the second aspect of the present invention, in the voltage booster system and the semiconductor chip, immediately after the regulator starts up, the output stage portion of the regulator is configured to restrict the output electric current. Accordingly, even when the output voltage of the regulator is applied to the first capacitor, the inrush current does not become excessive, thereby making it possible to prevent the power source voltage from decreasing.

Further, immediately after the first step of the voltage boosting operation (the pumping operation) of the charge pump circuit is started, the on resistivity of the first switching section increases, so that the first switching section restricts the electric current for charging the second capacitor. Accordingly, immediately after the first step is started, the inrush current for charging the second capacitor does not become excessive, thereby making it possible to prevent the power source voltage from decreasing. As a result, it is possible to stabilize the output voltage of the regulator. Accordingly, it is possible to prevent malfunction such as an unstable operation of other circuit such as a liquid crystal drive circuit and the like, to which the output voltage of the regulator is supplied.

DETAILED DESCRIPTION OF PREFERRED EMBODIMENTS

Figure 1:
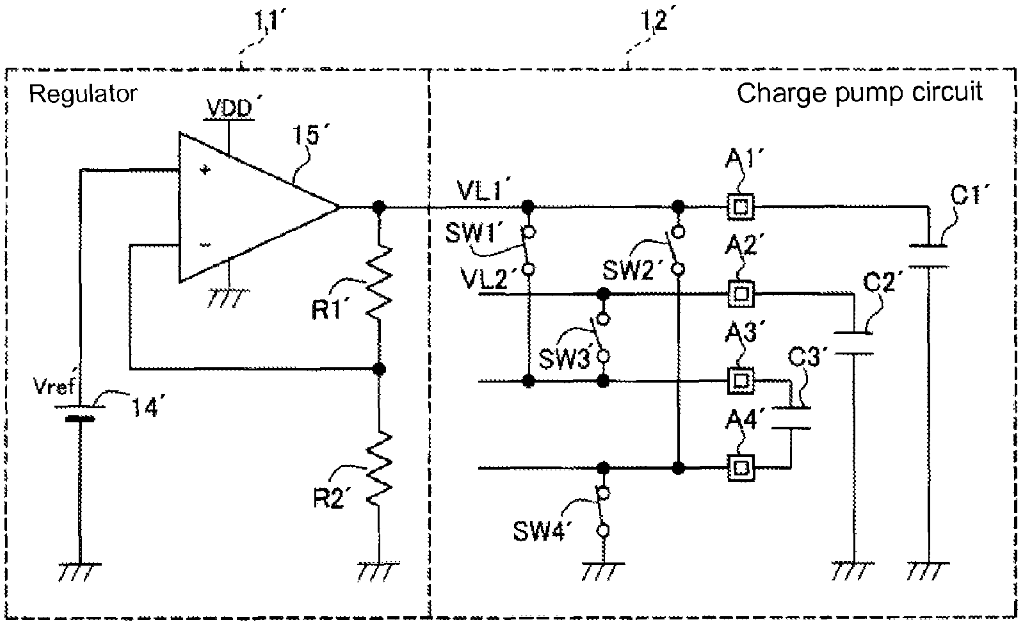
FIG. 1 PRIOR ART
FIG. 1 is a circuit diagram showing a configuration of a conventional voltage booster system.
Figure 2:
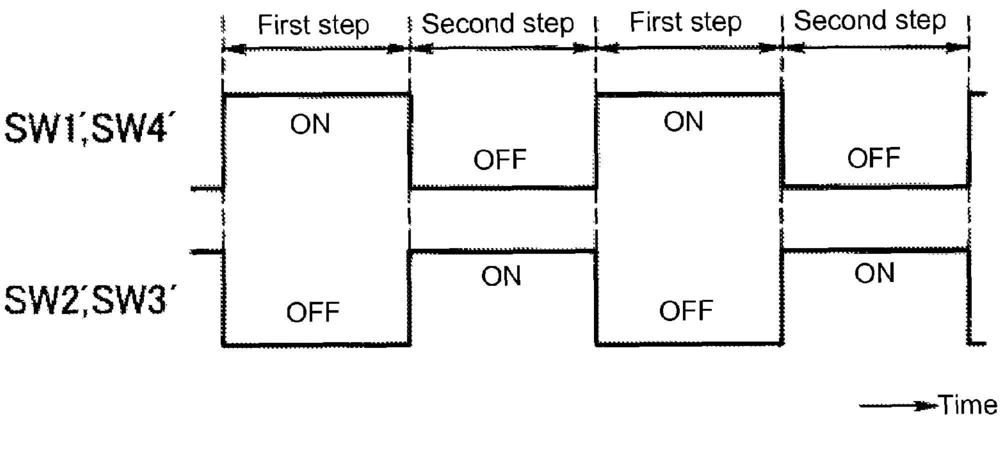
FIG. 2 PRIOR ART
FIG. 2 is a time chart showing an on-off operation of switching elements of a charge pump circuit of the conventional voltage booster system.
Figure 3A:
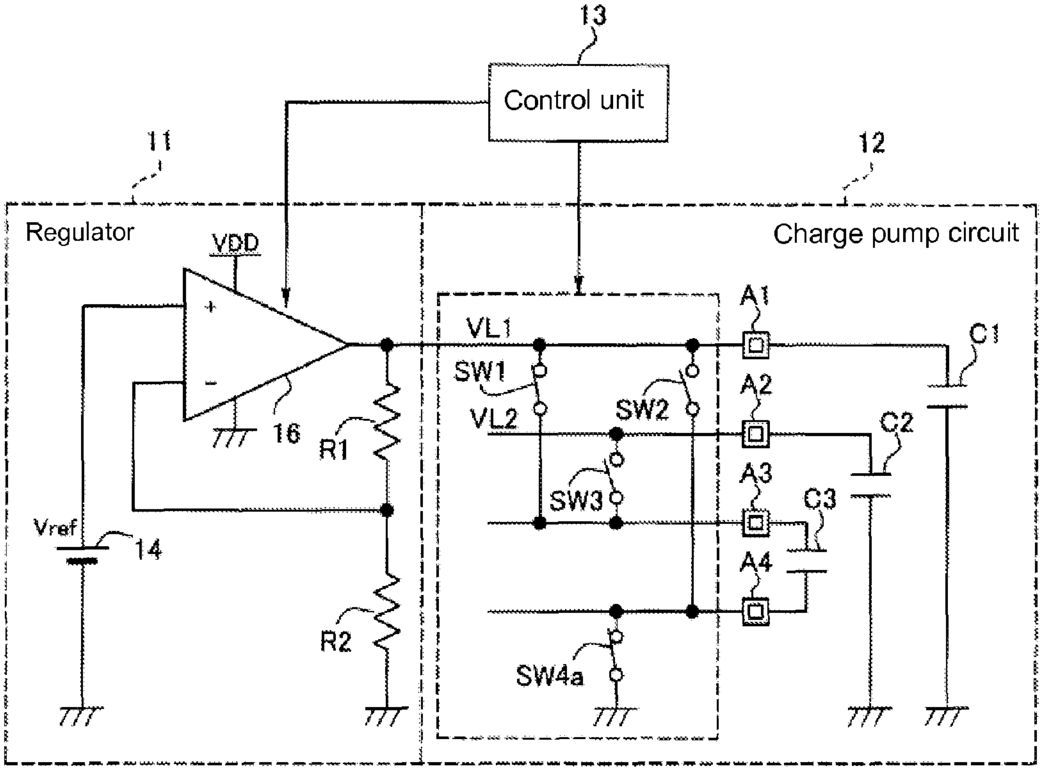
FIGS. 3(*a*) to 3(*d*) are circuit diagrams showing a configuration of a voltage booster system according to a first embodiment of the present invention, wherein FIG. 3(*a*) is a circuit diagram showing the configuration of the voltage booster system, FIG. 3(*b*) is a circuit diagram showing a configuration of an operation amplifier of the voltage booster system, FIG. 3(*c*) is a circuit diagram showing a configuration of a switching element of the voltage booster system, and FIG. 3(*d*) is a circuit diagram showing a configuration of another switching element of the voltage booster system.
Figure 3B:
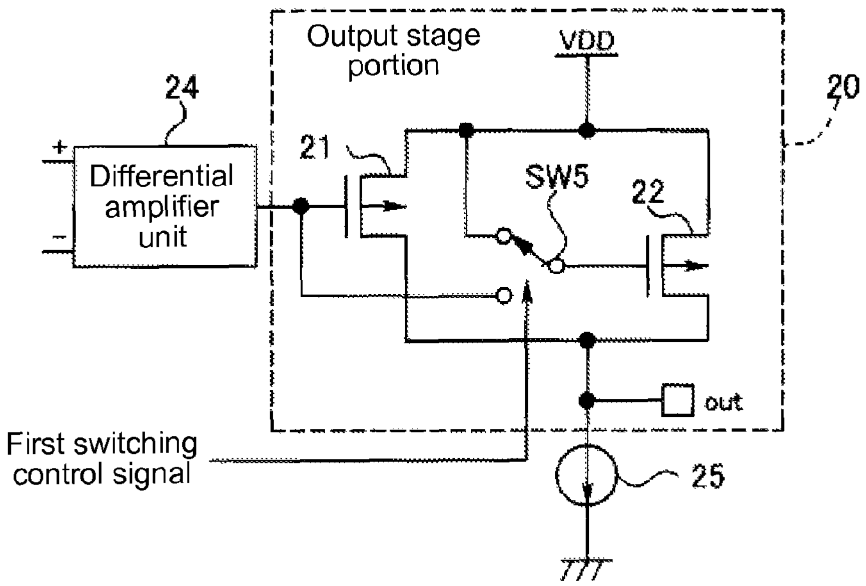
Figure 3C:
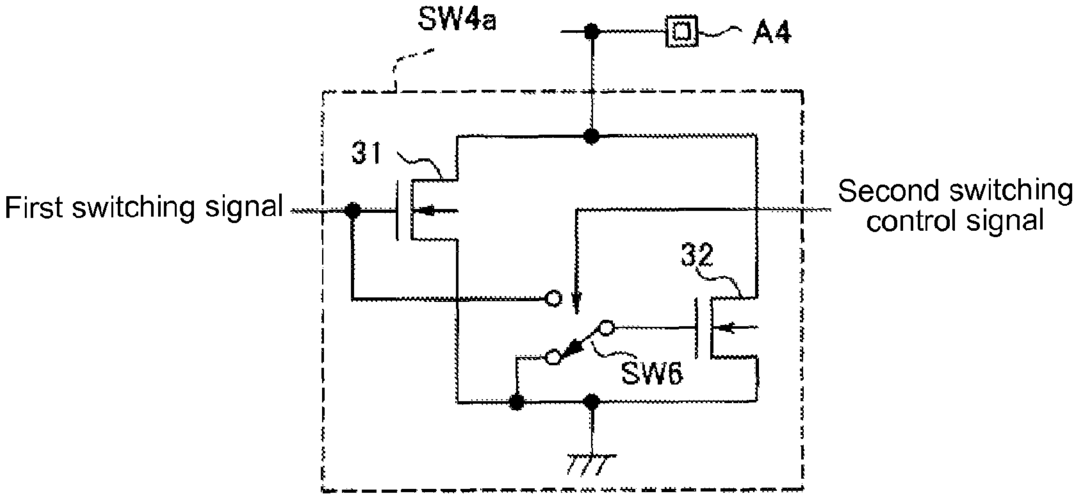
Figure 3D:
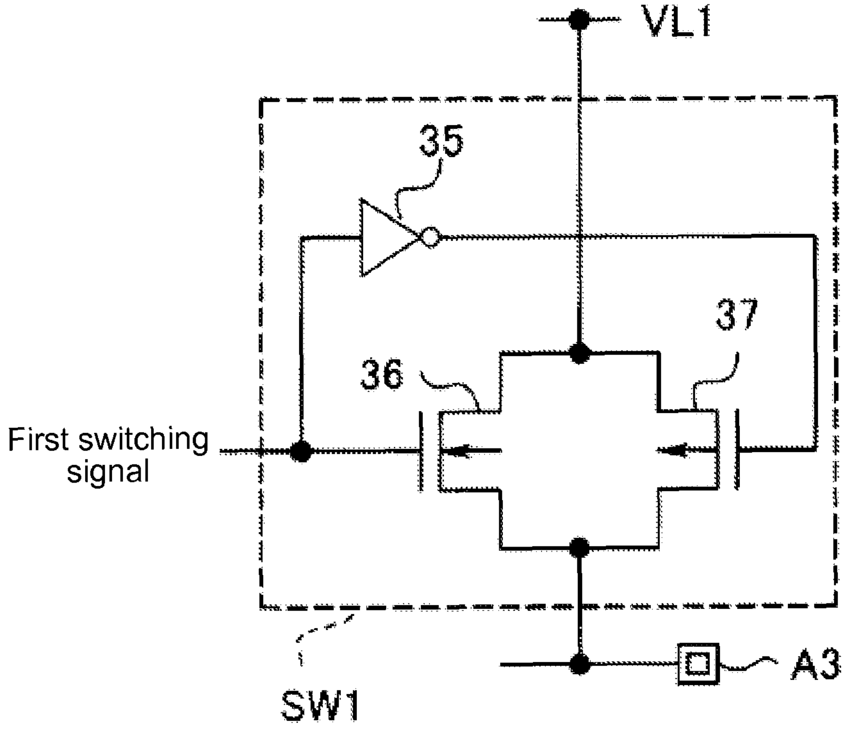

Hereunder, preferred embodiments of the present invention will be explained with reference to the accompanying drawings.

First Embodiment

A first embodiment of the present invention will be explained. FIGS. 3(*a*) to 3(*d*) are circuit diagrams showing a configuration of a voltage booster system according to the first embodiment of the present invention. More specifically, FIG. 3(*a*) is a circuit diagram showing the configuration of the voltage booster system. FIG. 3(*b*) is a circuit diagram showing a configuration of an operation amplifier 16 of the voltage booster system. FIG. 3(*c*) is a circuit diagram showing a configuration of a switching element SW4*a* of the voltage booster system. FIG. 3(*d*) is a circuit diagram showing a configuration of a switching element SW1 of the voltage booster system.

As shown in FIG. 3(*a*), the voltage booster system includes a regulator 11 and a charge pump circuit 12. The regulator 11 includes the operation amplifier 16, a power source 14, and resistors R1 and R2.

In the embodiment, the operation amplifier 16 is configured to operate at a power source voltage VDD. Further, a reference voltage Vref of the power source 14 is applied to a non-inversion input terminal of the operation amplifier 15. The resistors R1 and R2 are connected in series between an output terminal of the operation amplifier 16 and a reference potential (a ground potential) terminal. The resistors R1 and R2 constitute a divider circuit, so that a divided voltage is generated at a connection point between the resistors R1 and R2. The divided voltage is applied to an inversion input terminal of the operation amplifier 16 as a feedback voltage.

As shown in FIG. 3(*a*), the charge pump circuit 12 includes switching elements (a first switching element to a fourth switching element) SW1, SW2, SW3, and SW4*a*, and capacitors C1 to C3 connected externally. In the embodiment, the switching elements SW1 and SW4*a* correspond to a first switching section, and the switching elements SW2 and SW3 correspond to a second switching section. Further, the capacitor C1 corresponds to a first capacitor, the capacitor C2 corresponds to a second capacitor, and the capacitor C3 corresponds to a third capacitor.

In the embodiment, the charge pump circuit 12 further includes connection terminals A1 to A4. The connection terminal A1 (a first terminal) is connected to the output terminal of the operation amplifier 16.

In the embodiment, the switching element SW1 is connected between the connection terminal A1 and the connection terminal A3 (a second terminal). The switching element SW2 is connected between the connection terminal A1 and the connection terminal A4 (a third terminal). The switching element SW3 is connected between the connection terminal A2 (a fourth terminal) and the connection terminal A3. The switching element SW4*a* is connected between the connection terminal A4 and the reference potential terminal (a constant potential terminal).

In the embodiment, the capacitor C1 is connected between the connection terminal A1 and the reference potential terminal. The capacitor C2 is connected between the connection terminal A2 and the reference potential terminal. The capacitor C3 is connected between the connection terminal A3 and the connection terminal A4.

As shown in FIG. 3(*a*), in the embodiment, the voltage booster system further includes a control unit 13 formed of, for example, a CPU (Central Processing Unit). The control unit 13 may be provided as a control unit of a drive circuit of a liquid crystal display device. The control unit 13 is provided for generating a first switching signal for turning on and off each of the switching elements SW1 and SW4*a* and a second switching signal for turning on and off each of the switching elements SW2 and SW3.

FIG. 3(*b*) is the circuit diagram showing the configuration of the operation amplifier 16 of the voltage booster system. As shown in FIG. 3(*b*), the operation amplifier 16 includes at least a differential amplifier unit 24, the output stage portion 20, and a current source 25.

In the embodiment, the differential amplifier unit 24 includes an inversion input terminal and a non-inversion input terminal corresponding to the inversion input terminal and the non-inversion input terminal of the operation amplifier 16 shown in FIG. 3(*a*), so that the differential amplifier unit 24 generates an output signal according to a voltage difference between the divided voltage and the reference voltage Vref. The output stage portion 20 is connected to the differential amplifier unit 24 and the current source 25, so that the output stage portion 20 generates an output voltage VL1 according to the output signal of the differential amplifier unit 24. The current source 25 is provided for supplying an electric current to the output stage portion 20.

As shown in FIG. 3(*b*), the output stage portion 20 includes two PMOS (P-channel type MOS) transistors 21 and 22, and a switching portion SW5 (a first switching portion). It is configured such that an on resistivity (an internal resistivity at saturation) between a source and a drain of the PMOS transistor 21 (a second MOS transistor) becomes higher than an on resistivity (an internal resistivity at saturation) between a source and a drain of the PMOS transistor 22 (a first MOS transistor).

In the embodiment, the source of each of the PMOS transistors 21 and 22 is connected to a connection line of the power source voltage VDD, and the drain of each of the PMOS transistors 21 and 22 is connected to an output terminal out of the operation amplifier 16. A gate of the PMOS transistor 21 is connected to an output of the differential amplifier unit 24.

In the embodiment, the switching portion SW5 is configured to electrically connect a gate of the PMOS transistor 22 to one of the output of the differential amplifier unit 24 and the connection line of the power source voltage VDD according to a level of a first switching control signal from the control unit 13. More specifically, in an initial state, in which the power source voltage VDD is not powered on, the switching portion SW5 in the state that the gate of the PMOS transistor 22 is connected to the connection line of the power source voltage VDD. When a specific period of time is elapsed after the power source voltage VDD is powered on, the switching portion SW5 in the state that the gate of the PMOS transistor 22 is connected to the output of the differential amplifier unit 24 according to the level of the first switching control signal from the control unit 13.

FIG. 3(*c*) is the circuit diagram showing the configuration of the switching element SW4*a* of the voltage booster system. As shown in FIG. 3(*c*), the fourth switching element SW4*a* includes two NMOS (N-channel type MOS) transistors 31 and 32, and a switching portion SW6 (a second switching portion). A positive potential is applied to one end portion of the fourth switching element SW4*a*, and a reference potential (0 V) is applied to the other end portion of the fourth switching element SW4*a*. Accordingly, the NMOS transistors 31 and 32 are disposed.

In the embodiment, it is configured such that an on resistivity between a source and a drain of the NMOS transistor 31 (a fourth MOS transistor) becomes higher than an on resistivity between a source and a drain of the NMOS transistor 32 (a third MOS transistor).

In the embodiment, the drain of each of the NMOS transistors 31 and 32 is connected to a connection line of the connection terminal A4, and the source of each of the NMOS transistors 31 and 32 is connected to a ground terminal. The switching signal from the control unit 13 is supplied to a gate of the NMOS transistor 31. The switching portion SW6 is configured to electrically connect a gate of the NMOS transistor 32 to a gate of the NMOS transistor 31 or the ground terminal according to a level of a second switching control signal from the control unit 13.

FIG. 3(*d*) is the circuit diagram showing the configuration of the switching element SW1 of the voltage booster system. As shown in FIG. 3(*d*), the first switching element SW1 includes an inverter 35, an NMOS transistor 36, and a PMOS transistor 37. The NMOS transistor 36 and the PMOS transistor 37 are disposed in parallel between a line connected to the connection terminal A1 and a line connected to the connection terminal A3. The inverter 35 is configured to invert the first switching signal supplied to a gate of the NMOS transistor 36, and to supply the first switching signal to a gate of the PMOS transistor 37.

In the embodiment, in the switching element SW1 with the configuration described above, when the control unit 13 supplies the first switching signal indicating the on state, at least one of the NMOS transistor 36 and the PMOS transistor 37 is turned on. Further, when the control unit 13 supplies the first switching signal indicating the off state, at least one of the NMOS transistor 36 and the PMOS transistor 37 is turned off.

In the embodiment, the second switching element SW2 and the third switching element SW3 have a configuration similar to that of the first switching element SW1. Accordingly, each of the second switching element SW2 and the third switching element SW3 includes the NMOS transistor and the PMOS transistor having the different channel types.

It is noted that one of the terminals of each of the first switching element SW1, the second switching element SW2, and the third switching element SW3 may have a potential switched to become larger or smaller than that of the other of the terminals. With the NMOS transistor and the PMOS transistor having the different channel types, it is possible to turn on one of the NMOS transistor and the PMOS transistor.

In the embodiment, as described above, the control unit 13 is configured to generate the first switching control signal and the second switching control signal, in addition to the first switching signal and the second switching signal. It is noted that other components of the voltage booster system other than the power source 14 of the regulator 11 and the capacitors C1 to C3 of the charge pump circuit 12 may be integrally as a semiconductor chip. Further, the control unit 13 may be disposed in the semiconductor chip. Further, the power source for generating the power source voltage VDD may include a battery.

In the embodiment, when the voltage booster system starts, the switching portion SW5 connects the gate of the PMOS transistor 22 to the connection line of the power source voltage VDD. Accordingly, when the power source voltage VDD is applied to the voltage booster system, in the operation amplifier 16, the PMOS transistor 21 of the output stage portion 20 is turned on according to the output signal of the differential amplifier unit 24, and the PMOS transistor 22 is turned off due to the power source voltage VDD applied to the gate thereof. As a result, the output stage portion 20 of the operation amplifier 16 performs the electric current output operation solely through the PMOS transistor 21 having the high on resistivity, thereby reducing the electric current output performance.

In other words, the saturation electric current of the PMOS transistor 21 is lower than the saturation electric current of the PMOS transistor 22, so that the electric current output from the output stage portion 20 is restricted. Accordingly, when the output voltage VL1 of the operation amplifier 16 is applied to the capacitor C1 that is not charged, the inrush current does not become excessive, thereby making it possible to prevent the power source voltage VDD from decreasing.

Afterward, when the control unit 13 changes the level of the first switching control signal, the switching portion SW5 is controlled to switch, so that the gate of the PMOS transistor 22 is connected to the output of the differential amplifier unit 24. As a result, the PMOS transistor 22 is turned on, and both the PMOS transistor 21 and the PMOS transistor 22 output the electric current, thereby increasing the electric current output performance of the operation amplifier 16.

Figure 4:
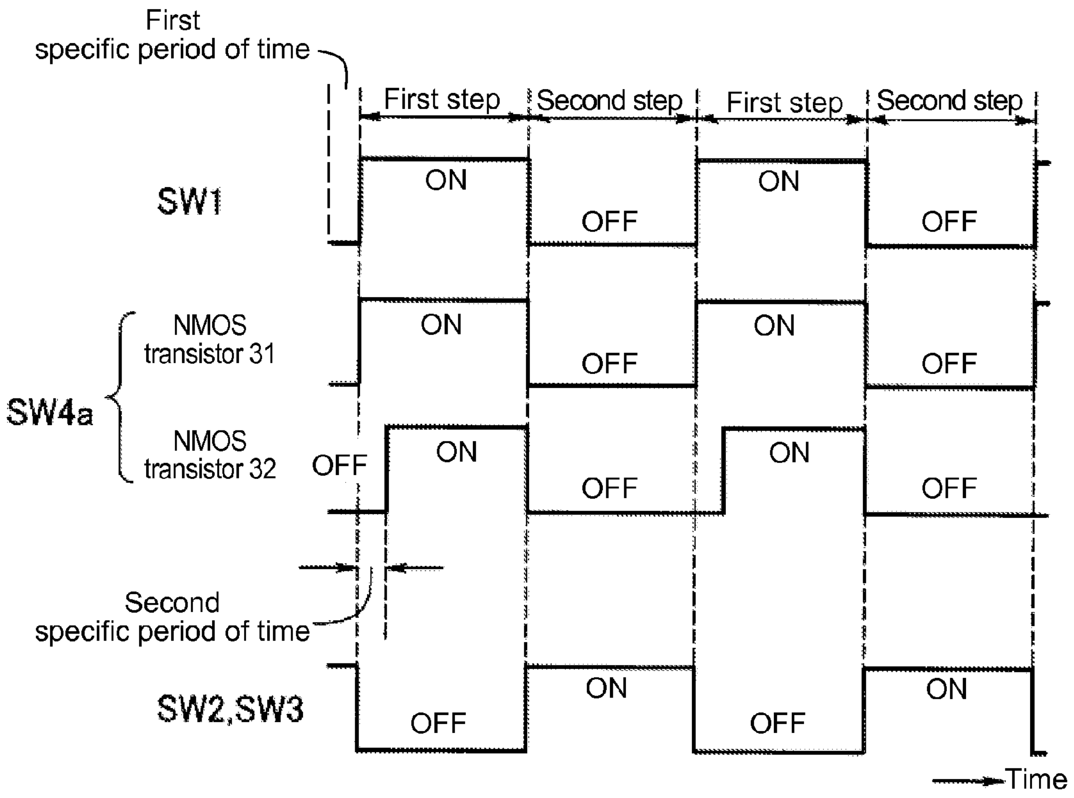
FIG. 4 is a time chart showing an on-off operation of the switching elements of a charge pump circuit of the voltage booster system according to the first embodiment of the present invention.

FIG. 4 is a time chart showing an on-off operation of the switching elements SW1, SW2, SW3, and SW4*a* of the charge pump circuit 12 of the voltage booster system according to the first embodiment of the present invention.

As shown in FIG. 4, after the charge pump circuit 12 starts the operation, in the first step, the control unit 13 supplies the first switching signal indicating the on state to the first switching element SW1 and the fourth switching element SW4*a*, and supplies the second switching signal indicating the off state to the second switching element SW2 and the third switching element SW3.

Accordingly, the switching element SW1 becomes the on state and the switching elements SW2 and SW3 become the off state. In the fourth switching element SW4*a*, the NMOS transistor 31 having the high on resistivity becomes the on state, and the NMOS transistor 32 having the gate connected to the ground through the switching portion SW6 becomes the off state.

Accordingly, from the start of the first step until a second specific period of time is elapsed, the electric current from the output line of the operation amplifier 16 flows to the ground through the first switching element SW1, the capacitor C3, and the NMOS transistor 31 of the fourth switching element SW4*a*, so that electric charges are accumulated in the capacitor C3. At this moment, in the fourth switching element SW4*a*, only the NMOS transistor 31 having the high on resistivity performs the electric current output operation, thereby reducing the electric current output performance. Accordingly, when the output voltage VL1 of the operation amplifier 16 is applied to the capacitor C1, the inrush current does not become excessive, thereby making it possible to prevent the power source voltage VDD from decreasing.

In the embodiment, after the second specific period of time is elapsed from the starting point when the first switching signal is generated, the control unit 13 controls the switching portion SW6 to switch, so that the switching portion SW6 connects the gate of the NMOS transistor 32 to the gate of the NMOS transistor 31. As a result, the NMOS transistor 32 becomes the on state according to the first switching signal indicating the on state and supplied to the gate of the NMOS transistor 31, and both the NMOS transistor 31 and the NMOS transistor 32 output the electric current to the ground. Accordingly, even when the capacitor C3 is not completely charged, it is possible to complete the charging in a short period of time. At last, a voltage between both end portions of the capacitor C3 becomes equal to the output voltage VL1.

In the embodiment, in the second step, when the first switching element SW1 and the fourth switching element SW4*a* (the NMOS transistor 31 and the NMOS transistor 32) are turned off, and instead the second switching element SW2 and the third switching element SW3 are turned on, the combined voltage of the capacitor C3 and the capacitor C1 is applied to the capacitor C2, so that electric charges of the capacitor C3 flow into the capacitor C2.

In the embodiment, when the first step and the second step are alternately repeated, a voltage VL2 of the capacitor C2, that is, the connection terminal A2, becomes double of the output voltage VL1. The voltage VL2 thus boosted is then supplied to other circuit through the connection terminal A2. Further, in the second step, the switching portion SW6 connects the gate of the NMOS transistor 32 to the gate of the NMOS transistor 31 according to the level of the second switching control signal from the control unit 13.

As described above, in the first embodiment, immediately after the regulator 11 of the voltage booster system starts up, the output stage portion 20 of the operation amplifier 16 performs the electric current output operation solely through the PMOS transistor 21 having the high on resistivity, thereby reducing the electric current output performance. Accordingly, when the output voltage VL1 of the operation amplifier 16 is applied to the capacitor C1, the inrush current does not become excessive, thereby making it possible to prevent the power source voltage VDD from decreasing.

Further, immediately after the charge pump circuit 12 starts the voltage boosting operation in the first step, the NMOS transistor 31 of the fourth switching element SW4*a* having the high on resistivity restricts the electric current from the output line of the operation amplifier 16 to the capacitor C3 to charge the capacitor C3.

In other words, the PN connection element of the output stage portion 20 increases the internal resistivity from when the regulator 11 starts up to when the first specific period of time is elapsed relative to the level after the first specific period of time is elapsed. Further, the first switching section increases the on resistivity thereof from when the voltage boosting operation starts to when the second specific period of time is elapsed relative to the level after the second specific period of time is elapsed, so that the electric current flowing from the output terminal to the capacitor C3 is restricted.

Accordingly, the inrush current does not increase excessively due to the charge of the capacitor C3 immediately after the first step starts, so that it is possible to prevent the power source voltage VDD from decreasing.

In the first embodiment, through the process described above, even when the charge pump circuit 12 disposed at the later stage of the regulator 11 is utilized for boosting the voltage, it is to stably operate the regulator 11. As a result, it is possible to prevent malfunction such as an unstable operation of other circuit, to which the output voltage of the regulator 11 is supplied.

As described above, in the first embodiment, the output stage portion 20 includes the two transistors, the PMOS transistor 21 and the PMOS transistor 22, as a plurality of transistors. The present invention is not limited thereto, and the output stage portion 20 may include more than two transistors arranged in parallel, so that the transistors are switched to adjust the internal resistivity.

Similarly, as described above, in the first embodiment, the fourth switching element SW4*a* includes the two transistors, the NMOS transistor 31 and the NMOS transistor 32, as a plurality of switching elements. The present invention is not limited thereto, and the fourth switching element SW4*a* may include more than two transistors arranged in parallel, so that the transistors are switched to adjust the on resistivity.

Further, as described above, in the first embodiment, every time the charge pump circuit 12 performs the voltage boosting operation in the first step, the on resistivity of the fourth switching element SW4*a* is increased from when the first step starts to when the second specific period of time is elapsed. The present invention is not limited thereto, and it may configured such that the on resistivity of the fourth switching element SW4*a* is increased from when the voltage boosting operation of the charge pump circuit 12 (the first step starts for the first time) starts to when the second specific period of time is elapsed.

Second Embodiment

Figure 5:
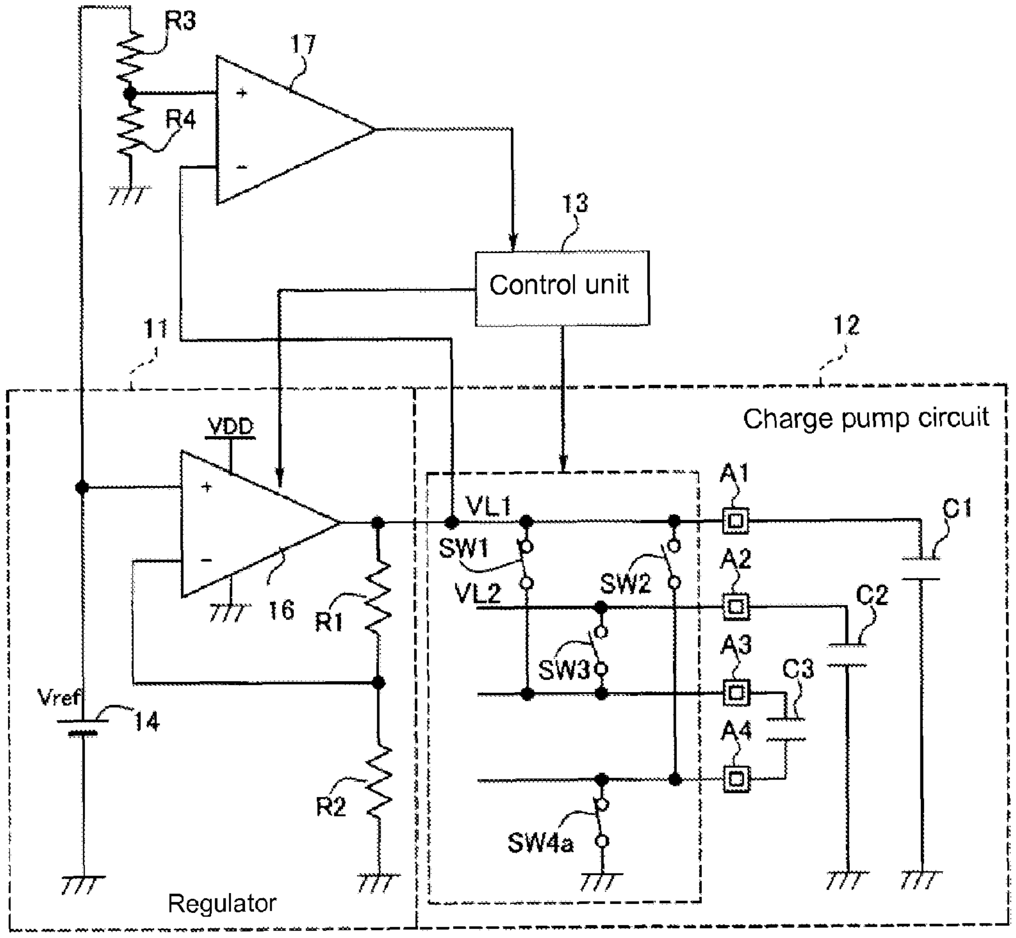
FIG. 5 is a circuit diagram showing a configuration of a voltage booster system according to a second embodiment of the present invention.

A second embodiment of the present invention will be explained next. FIG. 5 is a circuit diagram showing a configuration of a voltage booster system according to the second embodiment of the present invention.

As shown in FIG. 5, in addition to the configuration of the voltage booster system in the first embodiment shown in FIG.

3(*a*), the voltage booster system in the second embodiment includes a comparator 17 and resistors R3 and R4.

In the second embodiment, the resistors R3 and R4 constitute a divider circuit, so that the reference voltage Vref is divided to generate a threshold voltage. The comparator 17 is provided for comparing the output voltage VL1 of the output line of the operation amplifier 16 with the threshold voltage. An output of the comparator 17 is connected to the control unit 13.

In the second embodiment, the operation amplifier 16, the resistors R1 and R2, the switching elements SW1, SW2, SW3, and SW4*a*, and the capacitors C1 to C3 have configurations similar to those in the first embodiment shown in FIG. 3(*a*).

In the second embodiment, as described above, the comparator 17 is provided for comparing the output voltage VL1 of the output line of the operation amplifier 16 with the threshold voltage. When the output voltage VL1 is lower than the threshold voltage upon starting up the voltage booster system, an output level of the comparator 17 becomes a high level. According to the high level, the control unit 13 is configured to switch the switching portion SW5, so that the gate of the PMOS transistor 22 is connected to the connection line of the power source voltage VDD.

In the second embodiment, in the operation amplifier 16, the PMOS transistor 21 of the output stage portion 20 is turned on according to the output signal of the differential amplifier unit 24, and the PMOS transistor 22 is turned off due to the power source voltage VDD applied to the gate thereof. As a result, the output stage portion 20 of the operation amplifier 16 performs the electric current output operation solely through the PMOS transistor 21 having the high on resistivity, thereby reducing the electric current output performance. Accordingly, when the output voltage VL1 of the operation amplifier 16 is applied to the capacitor C1 that is not charged, the inrush current does not become excessive, thereby making it possible to prevent the power source voltage VDD from decreasing.

Afterward, when the output voltage VL1 becomes lower than the threshold voltage, the output level of the comparator 17 becomes a low level. According to the low level, the control unit 13 is configured to change the level of the first switching control signal to switch the switching portion SW5, so that the gate of the PMOS transistor 22 is connected to the output of the differential amplifier unit 24. Accordingly, the PMOS transistor 22 of the output stage portion 20 is turned on, so that both the PMOS transistor 21 and the PMOS transistor 22 outputs the electric current, thereby increasing the electric current output performance of the operation amplifier 16.

In the second embodiment, after the charge pump circuit 12 starts the operation, in the first step, the control unit 13 supplies the first switching signal indicating the on state to the first switching element SW1 and the fourth switching element SW4*a*, and supplies the second switching signal indicating the off state to the second switching element SW2 and the third switching element SW3. Accordingly, the switching element SW1 becomes the on state and the switching elements SW2 and SW3 become the off state.

In the second embodiment, further, when the first step starts, regardless of the connection state of the switching portion SW6 disposed in the fourth switching element SW4*a*, the output voltage VL1 becomes lower than the threshold voltage immediately after the first step starts. Accordingly, the output level of the comparator 17 becomes the high level. According to the high level, the control unit 13 switches the switching portion SW5, so that the gate of the NMOS transistor 32 is connected to the ground through the switching portion SW6 and the NMOS transistor 32 is turned off.

Accordingly, the electric current from the output line of the operation amplifier 16 flows to the ground through the first switching element SW1, the capacitor C3, and the NMOS transistor 31 of the fourth switching element SW4*a*, so that electric charges are accumulated in the capacitor C3. At this moment, in the fourth switching element SW4*a*, only the NMOS transistor 31 having the high on resistivity performs the electric current output operation, thereby reducing the electric current output performance.

Afterward, when the capacitor C3 is charged and the output voltage VL1 reaches the threshold voltage, the output level of the comparator 17 becomes the low level. According to the low level, the control unit 13 changes the level of the second switching control signal to switch the switching portion SW6, so that the gate of the NMOS transistor 32 is connected to the gate of the NMOS transistor 31. Accordingly, the NMOS transistor 32 is turned on according to the first switching signal indicating the on state and supplied to the gate of the NMOS transistor 31, so that both the NMOS transistor 31 and the NMOS transistor 32 outputs the electric current to the ground. As a result, if the capacitor C3 is not completely charged, it is possible to quickly charge the capacitor C3. Further, the voltage between the both end portions of the capacitor C3 becomes equal to the output voltage VL1.

In the second embodiment, similar to the first embodiment, in the second step, the first switching element SW1 and the fourth switching element SW4*a* (the NMOS transistor 31 and the NMOS transistor 32) are turned off according to the first switching signal indicating the off state. Further, the second switching element SW2 and the third switching element SW3 are turned on according to the second switching signal indicating the on state, so that the combined voltage of the capacitor C3 and the capacitor C1 is applied to the capacitor C2. Accordingly, electric charges of the capacitor C3 flow into the capacitor C2.

In the second embodiment, the first specific period of time corresponds to a period of time from when the power source voltage VDD is powered on to when the output voltage VL1 exceeds the threshold voltage. Further, the second specific period of time corresponds to a period of time from when the first step starts to when the output voltage VL1 exceeds the threshold voltage.

As described above, in the second embodiment, the output voltage VL1 becomes lower than the threshold voltage immediately after the first step starts. Further, the comparator 17 is configured to detect that the output voltage VL1 becomes lower than the threshold voltage, and the output stage portion 20 of the operation amplifier 16 performs the electric current output operation only through the PMOS transistor 21. As a result, immediately after the voltage booster system starts up, even when the output voltage VL1 of the operation amplifier 16 is applied to the capacitor C1, the inrush current does not become excessive. Accordingly, it is possible to prevent the power source voltage VDD from decreasing due to the excessive inrush current.

Further, in the second embodiment, immediately after the charge pump circuit 12 starts the voltage boosting operation in the first step, the output voltage VL1 becomes lower than the threshold voltage. Further, the comparator 17 is configured to detect that the output voltage VL1 becomes lower than the threshold voltage, and the switching portion SW6 is switched.

As a result, the NMOS transistor 31 of the fourth switching element SW4*a* having the high on resistivity restricts the electric current flowing from the output line of the operation amplifier 16 to charge the capacitor C3. Accordingly, immediately after the first step starts, it is possible to prevent the inrush current from increasing due to the capacitor C3 thus charged, thereby making it possible to prevent the power source voltage VDD from decreasing.

In the second embodiment, through the process described above, even when the charge pump circuit 12 disposed at the later stage of the regulator 11 is utilized for boosting the voltage, it is to stably operate the regulator 11. As a result, it is possible to prevent malfunction such as an unstable operation of other circuit, to which the output voltage of the regulator 11 is supplied.

Third Embodiment

Figure 6A:
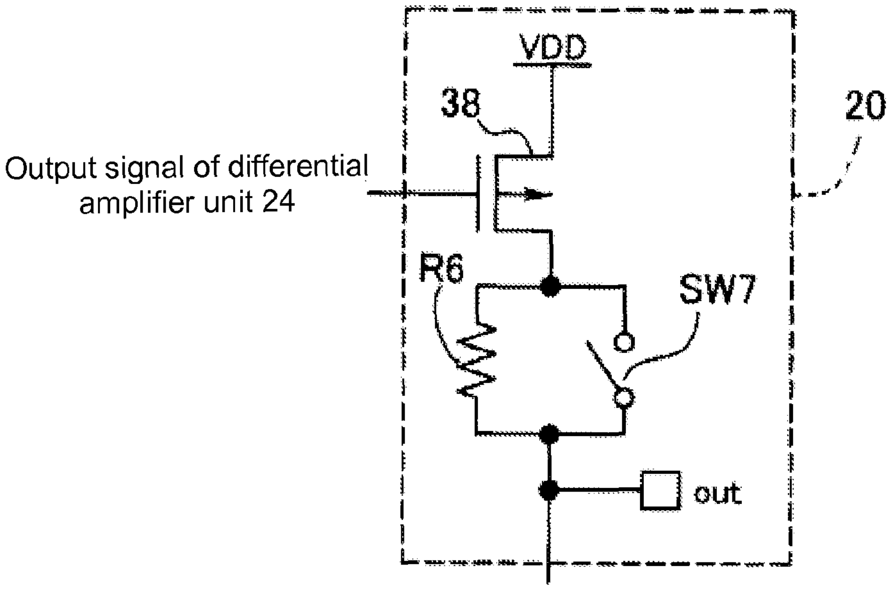
FIGS. 6(*a*) and 6(*b*) are circuit diagrams showing a configuration of a voltage booster system according to a third embodiment of the present invention, wherein FIG. 6(*a*) is a circuit diagram showing a configuration of an output stage portion of the voltage booster system, and FIG. 6(*b*) is a circuit diagram showing a configuration of a switching element of a charge pump circuit of the voltage booster system.
Figure 6B:
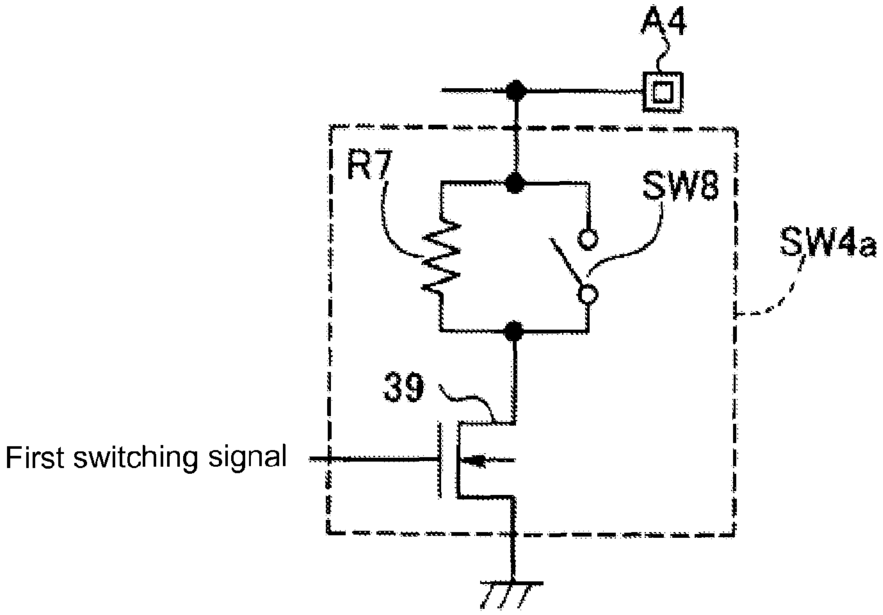

A third embodiment of the present invention will be explained next with reference to FIGS. 6(*a*) and 6(*b*). FIGS. 6(*a*) and 6(*b*) are circuit diagrams showing a configuration of a voltage booster system according to the third embodiment of the present invention. More specifically, FIG. 6(*a*) is a circuit diagram showing a configuration of the output stage portion 20 of the voltage booster system, and FIG. 6(*b*) is a circuit diagram showing a configuration of the switching element SW4*a* of the charge pump circuit 12 of the voltage booster system.

In the first and second embodiments described above, in the output stage portion 20 of the regulator 11 and the first switching section of the charge pump circuit 12, the two switching transistors are connected in parallel, and one of the two switching transistors has the high on resistivity. The present invention is not limited thereto.

In the third embodiment, as shown in FIG. 6(*a*), the output stage portion 20 has a configuration in which a parallel circuit of a resistor R6 and an on-off switching element SW7 is connected to a drain of a PMOS transistor 38. After the voltage booster system starts up, until the first specific period of time is elapsed, the on-off switching element SW7 is turned off. After the first specific period of time is elapsed, the on-off switching element SW7 is turned on.

Similarly, as shown in FIG. 6(*b*), the fourth switching element SW4*a* has a configuration in which a parallel circuit of a resistor R7 and an on-off switching element SW8 is connected to a drain of a PMOS transistor 39. After the first step is started, until the second specific period of time is elapsed, the on-off switching element SW8 is turned off. After the second specific period of time is elapsed, the on-off switching element SW8 is turned on.

Fourth Embodiment

Figure 7:
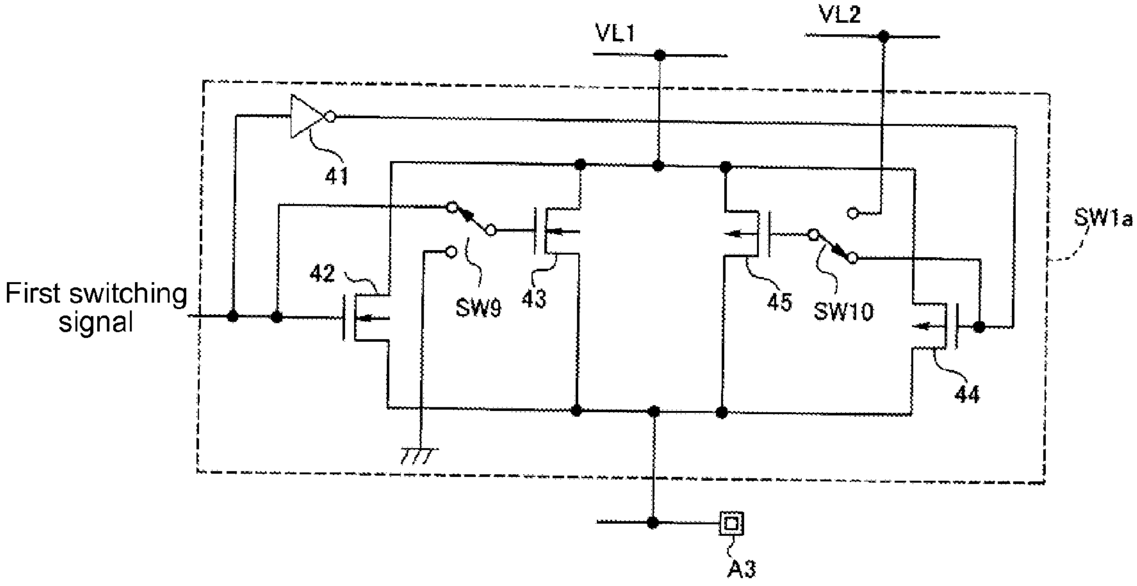
FIG. 7 is a circuit diagram showing a configuration of a switching element of a charge pump circuit of the voltage booster system according to a fourth embodiment of the present invention.

A fourth embodiment of the present invention will be explained next with reference to FIG. 7. FIG. 7 is a circuit diagram showing a configuration of a switching element 1*a* of the charge pump circuit 12 of the voltage booster system according to the fourth embodiment of the present invention.

In the first and second embodiments described above, the fourth switching element SW4*a* is provided for restricting the electric current for charging the capacitor C3 immediately after the first step is started. Alternatively, instead of the fourth switching element SW4*a*, the first switching element SW1 may be provided for performing the restriction function, or both the fourth switching element SW4*a* and the first switching element SW1 may be provided for performing the restriction function.

In the fourth embodiment, as shown in FIG. 7, the switching element 1*a* has the configuration similar to the first switching element SW1 and is provided with the restriction function. More specifically, the switching element SW1*a* includes an inverter 41, NMOS transistors 42 and 43, PMOS transistor 44 and 45, and switching sections SW9 and SW10.

In the fourth embodiment, it is configured such that the on resistivity between a drain and a source of the NOMS transistor 42 becomes higher than the on resistivity between a drain and a source of the NOMS transistor 43.

Further, it is configured such that the on resistivity between a drain and a source of the POMS transistor 44 becomes higher than the on resistivity between a drain and a source of the POMS transistor 45. It is noted that the switching element SW4' shown in FIG. 1 is disposed at the location where the fourth switching element SW4*a* shown in FIG. 3(*a*) is disposed. The switching element SW4' may be formed of one NMOS transistor.

In the fourth embodiment, in the voltage booster system including the switching element SW1*a*, from the start of the first step until the second specific period of time is elapsed, the electric current from the output line of the operation amplifier 16 flows to the ground through the transistor 42 or the transistor 44 of the switching element SW1*a*, the capacitor C3, and the switching element SW4', so that electric charges are accumulated in the capacitor C3.

At this moment, in the switching element SW1*a*, only the transistor 42 or the transistor 44 having the high on resistivity performs the electric current output operation, thereby reducing the electric current output performance. Accordingly, when the output voltage VL1 of the operation amplifier 16 is applied to the capacitor C1, the inrush current does not become excessive, thereby making it possible to prevent the power source voltage VDD from decreasing.

In the fourth embodiment, after the second specific period of time is elapsed, the control unit 13 controls the switching sections SW9 and SW10 to switch. Accordingly, the switching section SW9 connects the gate of the transistor 42 to the gate of the transistor 43. As a result, the transistor 43 becomes the on state according to the first switching signal indicating the on state and supplied to the gate of the transistor 42.

Further, the switching section SW10 connects the gate of the transistor 44 to the gate of the transistor 45. As a result, the transistor 44 becomes the on state according to the inverted signal of the first switching signal inverted with the inverter 41 and supplied to the gate of the transistor 44. Accordingly, it is possible to supply a sufficient amount of the electric current to the capacitor C3, so that the capacitor C3 is continuously charged.

The disclosure of Japanese Patent Application No. 2011-093828, filed on Apr. 20, 2011, is incorporated in the application by reference.

While the invention has been explained with reference to the specific embodiments of the invention, the explanation is illustrative and the invention is limited only by the appended claims.

What is claimed is:

1. A voltage booster system, comprising:

a regulator for outputting a constant voltage, said regulator including a differential amplifier unit for inputting a reference voltage and a feedback voltage according to the voltage of the output terminal, said regulator further including an output stage portion including an PN connection element having one end portion connected to an application terminal of a power source voltage and another end portion connected to the output terminal, said PN connection element being configured to be controlled according to an output signal of the differential amplifier unit; and a charge pump circuit for boosting a voltage of an output terminal of the regulator, said charge pump circuit including a first capacitor to which the voltage of the output terminal is applied to be charged, a second capacitor, a third capacitor, a first switching section, and a second switching section, wherein said charge pump circuit is configured to perform a first step and a second step as a voltage boosting operation, in which, in the first step, the first switching section becomes an on state and the second switching section becomes an off state so that the voltage of the output terminal is applied to the second capacitor to accumulate electric charges in the second capacitor, and in the second step, the first switching section becomes the off state and the second switching section becomes the on state so that a combined voltage of a first voltage between both end portions of the first capacitor and a second voltage between both end portions of the second capacitor is applied to the third capacitor through the second switching section to accumulate electric charges in the second capacitor, said PN connection element is configured to increase an internal resistivity thereof after the regulator starts up until a first specific period of time is elapsed relative to the internal resistivity after the first specific period of time is elapsed so that an electric current flowing from the application terminal of the power source voltage to the first capacitor is restricted, and said first switching section is configured to increase an on resistivity thereof after the voltage boosting operation is started until a second specific period of time is elapsed relative to that after the second specific period of time is elapsed.

2. The voltage booster system according to claim 1, wherein said first switching section includes a plurality of switching elements connected in parallel, said switching elements being configured to be switched to increase the on resistivity.

3. The voltage booster system according to claim 1, wherein said PN connection element includes a plurality of switching elements connected in parallel, said switching elements being configured to be switched to increase the internal resistivity.

4. The voltage booster system according to claim 1, wherein said charge pump circuit is configured to alternately repeat the first step and the second step so that each time the first step is performed, the first switching section is configured to increase the on resistivity thereof after the first step is started until the second specific period of time is elapsed relative to that after the second specific period of time is elapsed so that the electric current flowing from the output terminal to the second capacitor is restricted.

5. The voltage booster system according to claim 1, wherein said first switching section includes a first switching element connected between the output terminal connected to one end portion of the first capacitor and one end portion of the second capacitor and a fourth switching element connected between another end portion of the second capacitor and ground, said second switching section includes a second switching element connected between the output terminal and the another end portion of the second capacitor and a third switching element connected between the one end portion of the second capacitor and one end portion of the third capacitor, said first capacitor has another end portion connected to the ground, and said third capacitor has another end portion connected to the ground.

6. The voltage booster system according to claim 5, further comprising a control unit for supplying a first switching signal to the first switching element and the fourth switching element so that the first switching element and the fourth switching element become the on state in the first step and the first switching element and the fourth switching element become the off state in the second step, and for supplying a second switching signal to the second switching element and the third switching element so that the second switching element and the third switching element become the off state in the first step and the second switching element and the third switching element become the on state in the second step.

7. The voltage booster system according to claim 1, wherein said PN connection element includes a first MOS transistor having a source connected to the application terminal of the power source voltage and a drain connected to the output terminal, and a second MOS transistor having a source connected to the application terminal of the power source voltage, a drain connected to the output terminal, and a gate for applying the output signal of the differential amplifier unit, said second MOS transistor having the on resistivity higher than that of the first MOS transistor, and said output stage portion includes a first switching portion for applying the power source voltage to a gate of the first MOS transistor over the first period of time, and for applying the output signal of the differential amplifier unit to the gate of the first MOS transistor after the first specific period of time is elapsed.

8. The voltage booster system according to claim 6, wherein said fourth switching element includes a third MOS transistor having a drain connected to the another end portion of the second capacitor and a source connected to the ground, a fourth MOS transistor having a drain connected to the another end portion of the second capacitor, a source connected to the ground, and a gate for applying the first switching signal, said fourth MOS transistor having the on resistivity higher than that of the third MOS transistor, and a second switching portion for applying a potential of the ground to a gate of the third MOS transistor over the second period of time, and for applying the first switching signal to the gate of the third MOS transistor after the second specific period of time is elapsed.

9. The voltage booster system according to claim 1, wherein said regulator includes a first divider circuit for dividing the voltage of the output terminal to generate the feedback voltage.

10. The voltage booster system according to claim 1, wherein said regulator includes a second divider circuit for dividing the reference voltage to generate a threshold voltage, and a comparator for comparing the voltage of the output terminal and the threshold voltage, said first specific period of time is defined from when the power source voltage is powered on to when the voltage of the output terminal exceeds the threshold voltage, and said second specific period of time is defined from when the first step is started to when the voltage of the output terminal exceeds the threshold voltage.

11. The voltage booster system according to claim 1, further comprising a power source unit for generating the power source voltage, said power source being formed of a battery.

12. A semiconductor chip, comprising:

a regulator for outputting a constant voltage, said regulator including a differential amplifier unit for inputting a reference voltage and a feedback voltage according to the voltage of the output terminal, said regulator further including an output stage portion including an PN connection element having one end portion connected to an application terminal of a power source voltage and another end portion connected to the output terminal, said PN connection element being configured to be controlled according to an output signal of the differential amplifier unit; and a charge pump circuit for boosting a voltage of an output terminal of the regulator, said charge pump circuit including a first terminal to be externally connected to one end portion of a first capacitor to which the voltage of the output terminal is applied to be charged, a second terminal and a third terminal to be externally connected to both end portions of a second capacitor, a fourth terminal to be externally connected to a third capacitor, a first switching section, and a second switching section, wherein said charge pump circuit is configured to sequentially perform a first step and a second step as a voltage boosting operation, in which, in the first step, the first switching section becomes an on state and the second switching section becomes an off state so that the voltage of the output terminal is applied to the second capacitor through the first switching section to accumulate electric charges in the second capacitor, and in the second step, the first switching section becomes the off state and the second switching section becomes the on state so that a combined voltage of a first voltage between both end portions of the first capacitor and a second voltage between both end portions of the second capacitor is applied to the third capacitor through the second switching section to accumulate electric charges in the second capacitor, said PN connection element is configured to increase an internal resistivity thereof after the regulator starts up until a first specific period of time is elapsed relative to the internal resistivity after the first specific period of time is elapsed so that an electric current flowing from the application terminal of the power source voltage to the first capacitor is restricted, and said first switching section is configured to increase an on resistivity thereof after the voltage boosting operation is started until a second specific period of time is elapsed relative to that after the second specific period of time is elapsed, so that an electric current flowing from the output terminal to the second capacitor is restricted.

13. The semiconductor chip according to claim 12, wherein said first switching section includes a first switching element connected between the output terminal connected to one end portion of the first capacitor and one end portion of the second capacitor and a fourth switching element connected between another end portion of the second capacitor and ground, said second switching section includes a second switching element connected between the output terminal and the another end portion of the second capacitor and a third switching element connected between the one end portion of the second capacitor and one end portion of the third capacitor, said first capacitor has another end portion connected to the ground, and said third capacitor has another end portion connected to the ground.

14. The semiconductor chip according to claim 13, further comprising a control unit for supplying a first switching signal to the first switching element and the fourth switching element so that the first switching element and the fourth switching element become the on state in the first step and the first switching element and the fourth switching element become the off state in the second step, and for supplying a second switching signal to the second switching element and the third switching element so that the second switching element and the third switching element become the off state in the first step and the second switching element and the third switching element become the on state in the second step.

* * * * *